United States Patent
Makino

(10) Patent No.: US 12,319,164 B2
(45) Date of Patent: Jun. 3, 2025

(54) POWER FEEDING MANAGEMENT SYSTEM AND ON-VEHICLE APPARATUS

(71) Applicant: SUBARU CORPORATION, Tokyo (JP)

(72) Inventor: Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 595 days.

(21) Appl. No.: 17/678,439

(22) Filed: Feb. 23, 2022

(65) Prior Publication Data

US 2022/0297559 A1    Sep. 22, 2022

(30) Foreign Application Priority Data

Mar. 17, 2021    (JP) ................... 2021-043783

(51) Int. Cl.
*H02J 7/00*        (2006.01)
*B60L 53/30*       (2019.01)
(Continued)

(52) U.S. Cl.
CPC ............ *B60L 53/305* (2019.02); *B60L 53/64* (2019.02); *B60L 53/65* (2019.02); *B60L 53/665* (2019.02);
(Continued)

(58) Field of Classification Search
CPC ........ B60L 53/305; B60L 53/64; B60L 53/65; B60L 53/665; B60L 55/00; B60L 58/12;
(Continued)

(56) References Cited

U.S. PATENT DOCUMENTS

2019/0047427 A1*  2/2019  Pogorelik ............ G06Q 20/405
2020/0215929 A1*  7/2020  Javaid ................ B60L 53/38
(Continued)

FOREIGN PATENT DOCUMENTS

JP    2007-252118 A    9/2007
JP    2013-115873 A    6/2013
(Continued)

OTHER PUBLICATIONS

Office Action dated Oct. 29, 2024, from corresponding Japanese Patent Application No. 2021-043783, 7 pages.

*Primary Examiner* — Nghia M Doan
(74) *Attorney, Agent, or Firm* — Rimon P.C.

(57) ABSTRACT

A power feeding management system includes a management apparatus and a plurality of on-vehicle apparatuses. The management apparatus communicates with the on-vehicle apparatuses of first and second vehicles to assist the first and second vehicles with first inter-vehicle power feeding to the first vehicle from the second vehicle. The management apparatus decides a price on the power-receiver side of the first inter-vehicle power feeding on the basis of a common power price and an amount of fed power in the first inter-vehicle power feeding. The management apparatus decides a return on the power-sender side of the first inter-vehicle power feeding on the basis of the amount of fed power in the first inter-vehicle power feeding and a power price for external charging carried out by the second vehicle before the first inter-vehicle power feeding.

7 Claims, 10 Drawing Sheets

(51) Int. Cl.
*B60L 53/64* (2019.01)
*B60L 53/65* (2019.01)
*B60L 53/66* (2019.01)
*B60L 55/00* (2019.01)
*B60L 58/12* (2019.01)
*H02J 7/34* (2006.01)

(52) U.S. Cl.
CPC ............... *B60L 55/00* (2019.02); *B60L 58/12* (2019.02); *H02J 7/342* (2020.01)

(58) Field of Classification Search
CPC ... B60L 2240/62; H02J 7/342; H02J 2310/48; H02J 7/00034; H02J 7/0048; H02J 7/00032; H02J 7/0068; H02J 7/007188; H02J 7/32
See application file for complete search history.

(56) References Cited

U.S. PATENT DOCUMENTS

2020/0282857 A1* 9/2020 Mortensen ............... B60L 53/16
2021/0078433 A1* 3/2021 Cha .......................... B60L 53/65

FOREIGN PATENT DOCUMENTS

| JP | 2020-086912 A | 6/2020 |
| JP | 2020-170419 A | 10/2020 |
| WO | 2013-122073 A1 | 8/2013 |

* cited by examiner

POWER FEEDING MANAGEMENT SYSTEM AND ON-VEHICLE APPARATUS

CROSS-REFERENCE TO RELATED APPLICATIONS

This application claims priority from Japanese Patent Application No. 2021-043783 filed on Mar. 17, 2021, the entire contents of which are hereby incorporated by reference.

BACKGROUND

The technology relates to a power feeding management system that performs management related to inter-vehicle power feeding, and an on-vehicle apparatus.

Vehicles such as electric vehicles and plug-in hybrid vehicles include a high-voltage battery of large capacity and are able to travel with electric power charged in the battery. As examples of methods of charging high-voltage batteries, not only external charging through a cable but also non-contact charging have been put in practice. Furthermore, proposals have been made for inter-vehicle power feeding techniques. Inter-vehicle power feeding includes transmitting and receiving electric power between a plurality of vehicles through a cable or in a non-contact manner.

Japanese Unexamined Patent Application Publication (JP-A) No. 2020-086912 describes a charging and discharging system that enhances convenience of inter-vehicle power feeding. In the charging and discharging system, a vehicle that is able to supply electric power sends, to other vehicles, price data for sending electric power. In a case where a vehicle in need of electric power accepts the price, these vehicles are paired for the inter-vehicle power feeding.

SUMMARY

An aspect of the technology provides a power feeding management system including a management apparatus and a plurality of on-vehicle apparatuses. The management apparatus is configured to perform management related to inter-vehicle power feeding. The plurality of the on-vehicle apparatuses is mounted on respective ones of a plurality of vehicles and is configured to communicate with the management apparatus. The plurality of the vehicles is configured to perform the inter-vehicle power feeding. The management apparatus has setting of a common power price for the inter-vehicle power feeding. The management apparatus is configured to communicate with the on-vehicle apparatus of a first vehicle out of the plurality of the vehicles and the on-vehicle apparatus of a second vehicle out of the plurality of the vehicles, to assist the first vehicle and the second vehicle with first inter-vehicle power feeding to the first vehicle from the second vehicle. The first vehicle makes a power feeding request, and the second vehicle is available for acceptance of the power feeding request. The management apparatus is configured to decide a price on the power-receiver side of the first inter-vehicle power feeding on the basis of the common power price and an amount of fed power in the first inter-vehicle power feeding. The management apparatus is configured to decide a return on the power-sender side of the first inter-vehicle power feeding on the basis of the amount of fed power in the first inter-vehicle power feeding and a power price for external charging carried out by the second vehicle before the first inter-vehicle power feeding.

An aspect of the technology provides an on-vehicle apparatus to be mounted on a vehicle configured to perform inter-vehicle power feeding and external charging. The on-vehicle apparatus includes a communication unit configured to communicate with a management apparatus disposed outside the vehicle. The communication unit is configured to receive, from the management apparatus, a power feeding request for the inter-vehicle power feeding a return for which is decided on the basis of a power price for the external charging. The communication unit is configured to send, to the management apparatus, a power feeding request for the inter-vehicle power feeding a price for which is decided on the basis of a common power price.

An aspect of the technology provides a power feeding management system including a management apparatus and a plurality of on-vehicle apparatuses. The management apparatus is configured to perform management related to inter-vehicle power feeding. The plurality of the on-vehicle apparatuses is mounted on respective ones of a plurality of vehicles and is configured to communicate with the management apparatus. The plurality of the vehicles is configured to perform the inter-vehicle power feeding. The management apparatus includes a storage device. The storage device is configured to hold setting of a common power price for the inter-vehicle power feeding. The management apparatus is configured to communicate with the on-vehicle apparatus of a first vehicle out of the plurality of the vehicles and the on-vehicle apparatus of a second vehicle out of the plurality of the vehicles, to assist the first vehicle and the second vehicle with first inter-vehicle power feeding to the first vehicle from the second vehicle. The first vehicle makes a power feeding request, and the second vehicle is available for acceptance of the power feeding request. The management apparatus includes circuitry. The circuitry is configured to decide a price on the power-receiver side of the first inter-vehicle power feeding on the basis of the common power price and an amount of fed power in the first inter-vehicle power feeding. The circuitry is configured to decide a return on the power-sender side of the first inter-vehicle power feeding on the basis of the amount of fed power in the first inter-vehicle power feeding and a power price for external charging carried out by the second vehicle before the first inter-vehicle power feeding.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
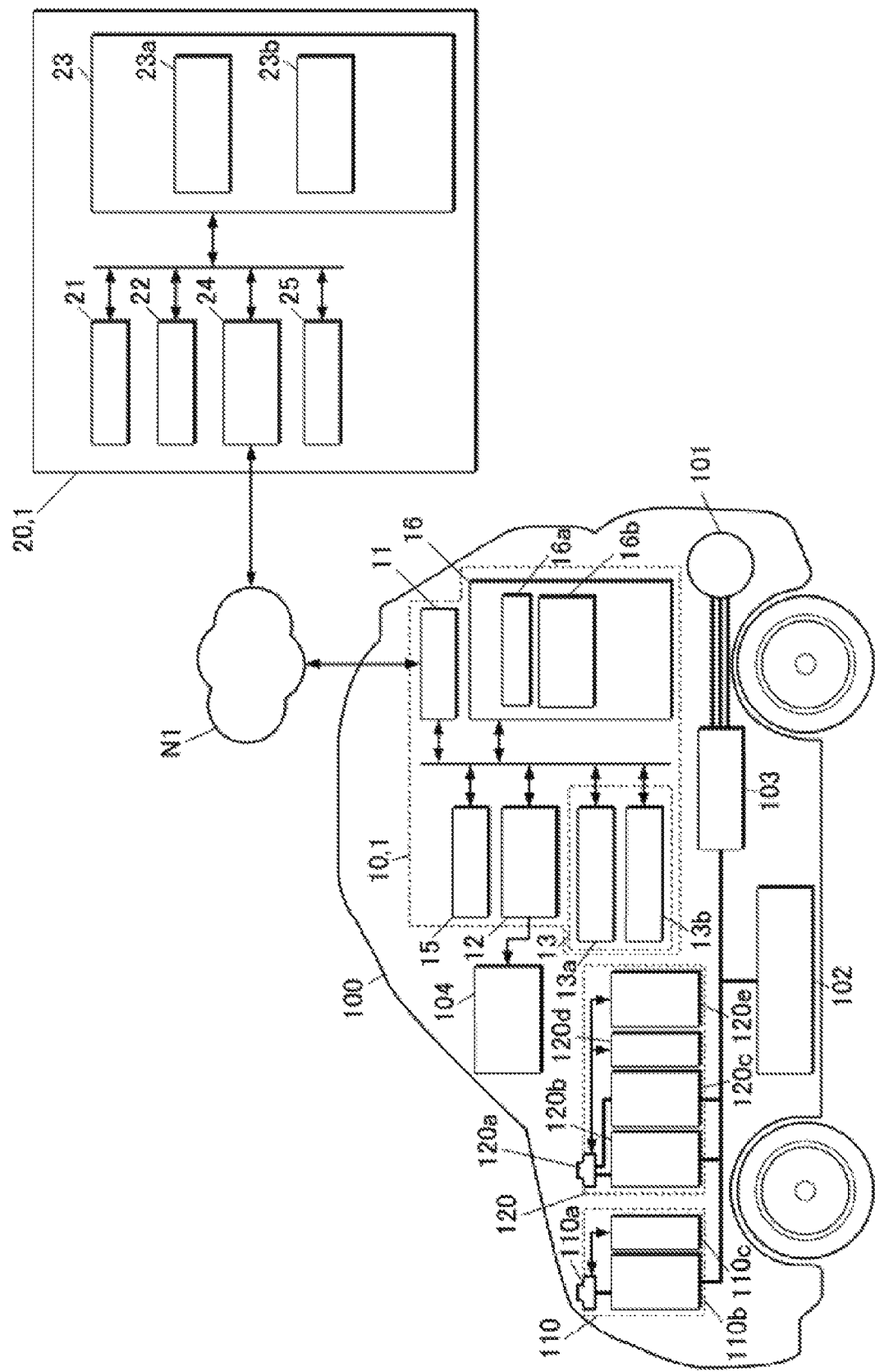
FIG. 1 is a block diagram of a power feeding management system according to an embodiment of the technology.

In an existing charging and discharging system as disclosed in JP-A No. 2020-086912, an occupant of a vehicle who wants power feeding receives various pieces of price data. The occupant has to search for a vehicle that feeds electric power to them, while getting confused about which vehicle they should be fed with electric power from. This hinders them from deciding quickly which vehicle to choose for power feeding. When the vehicle is in need of power feeding, delaying the decision about which vehicle to choose for power feeding may result in electric power shortage, and possibility may be that the vehicle becomes unable to travel.

It is desirable to provide a power feeding management system and an on-vehicle apparatus that make it possible to carry out smooth inter-vehicle power feeding.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a block diagram of a power feeding management system according to an embodiment of the disclosure. A power feeding management system 1 according to this embodiment is a system that performs management related to inter-vehicle power feeding. The power feeding management system 1 includes, without limitation, a plurality of on-vehicle apparatuses 10 and a management apparatus 20. The plurality of the on-vehicle apparatuses 10 is mounted on respective ones of a plurality of vehicles 100. The plurality of the vehicles 100 is configured to perform the inter-vehicle power feeding and external charging. The management apparatus 20 is configured to communicate with the plurality of the on-vehicle apparatuses 10 through a communication network N1.

The vehicle 100 may be an electric motor vehicle such as an EV (Electric Vehicle) or a PHEV (Plug-in Hybrid Electric Vehicle). The vehicle 100 may include, without limitation, a traveling motor 101, a battery 102, and an inverter 103. The traveling motor 101, or an electric motor 101, is configured to generate motive power for driving wheels with electric power. The battery 102, or a high-voltage battery 102, is configured to accumulate electric power for traveling. The inverter 103 is configured to drive the traveling motor 101 with electric power of the battery 102.

The vehicle 100 may further include a charging device 110. The charging device 110 is configured to receive electric power from a charging station or charging facilities owned by an individual to charge the battery 102. The charging device 110 may include, without limitation, a charging connector 110a, an on-vehicle charger 110b, and a communication unit 110c. The charging connector 110a is configured to be coupled to an external charging plug. The on-vehicle charger 110b is configured to charge the battery 102 with electric power supplied from the charging connector 110a. The communication unit 110c is configured to communicate with the charging facilities. To the charging plug, electric power is transmitted through a power cable from an external power supply at the charging station or the charging facilities owned by an individual. It is to be noted that the charging device 110 is not limited to the configuration as mentioned above, but may have a configuration including a power receiving-coil and an on-vehicle charger. The receiving-coil is configured to perform non-contact electric power reception. The on-vehicle charger is configured to transmit, to the battery 102, electric power received through the power-receiving coil. In this case, the charging facilities may include a power-transmitting coil configured to perform non-contact power transmission to the power-receiving coil.

On the occasion of charging of the battery 102 through the charging device 110, charging data may be sent from the charging facilities to the communication unit 110c. The charging data may include power price data, e.g., power unit price data, for the external charging. The power price data means data regarding a power price. The power unit price data means data regarding a power unit price. The charging data may further include data regarding an amount of charged power. The charging data may be also sent to the on-vehicle apparatus 10 from the communication unit 110c. It is to be noted that another configuration may be adopted in which the power price data for the external charging is inputted by, for example, a user's operation on a key, instead of being sent to the on-vehicle apparatus 10 from the charging facilities through the communication unit 110c. In another alternative, other devices than the charging device 110 may acquire the power price data for the external charging by communication and send the acquired data to the on-vehicle apparatus 10.

The vehicle 100 may further include a power feeding device 120. The power feeding device 120 is configured to perform the inter-vehicle power feeding. The term "inter-vehicle power feeding" means, for example, charging to be carried out between two vehicles 100, i.e., charging the battery 102 of one of the vehicles 100 with electric power of the battery 102 of the other of the vehicles 100. The power feeding device 120 may have a configuration in which electric power to be fed is transmitted through a power cable, or a configuration in which electric power to be fed is transmitted in a non-contact manner through a coil for electric power transmission.

The power feeding device 120 may include, without limitation, a transmission unit 120a, an on-vehicle charger 120b, and an on-vehicle power transmitter 120c. The transmission unit 120a may include, for example, a power cable and a connector, or a coil for non-contact transmission, and is configured to transmit electric power. The on-vehicle charger 120b is configured to be in operation in receiving electric power. The on-vehicle power transmitter 120c is configured to be in operation in transmitting electric power. The power feeding device 120 may further include, without limitation, a communication unit 120d and a power feeding control processor 120*e*. The communication unit 120*d* is configured to perform communication between power-sender side and power-receiver side. The power feeding control processor 120*e* is configured to make a power feeding control. It is to be noted that the on-vehicle charger 110*b* of the charging device 110 may also serve as the on-vehicle charger 120*b* of the power feeding device 120, and vice versa. In a configuration in which the transmission unit 120*a* is configured to be coupled to a plug of a power cable, the transmission unit 120*a* of the power feeding device 120 may also serve as the charging connector 110*a* of the charging device 110, and vice versa.

The power feeding control processor 120*e* may include a microcomputer including a CPU (Central Processing Unit), a RAM (Read Only Memory), a storage, and interfaces. The CPU may expand data in the RAM. The storage may hold control programs to be executed by the CPU, and control data. The interfaces are provided for data transmission and reception between the CPU and peripheral devices. The power feeding control processor 120*e* may control power transmission from one of the vehicles 100 to another of the vehicles 100 while performing communication between the power-sender side and the power-receiver side through the communication unit 120*d*. The amount of fed power may be measured and stored by one or both of the power feeding control processors 120*e* of the vehicles 100.

The on-vehicle apparatus 10 may include, without limitation, a communication unit 11 and a display processor 12. The communication unit 11 may perform communication through the communication network N1. The display processor 12 may output a display signal to a display panel 104 of the vehicle 100. The on-vehicle apparatus 10 may further include, without limitation, an operation unit 13, a processor 15, and a storage 16. The operation unit 13 may accept an operation of a power feeding request from an occupant of the vehicle 100. The processor 15 may carry out control processing for power feeding management. The storage 16 may hold data. The processor 15 may be supplied with data regarding a state of charge (SOC) of the battery 102 from a management unit of the battery 102. The processor 15 may include a microcomputer including a CPU, a RAM, a storage, and interfaces. The CPU may execute a control program. The CPU may expand data in the RAM. The storage may hold the control program to be executed by the CPU, and control data. The interfaces may be provided for data transmission and reception between the CPU and peripheral devices.

The on-vehicle apparatus 10 may have unique identification data (ID). The identification data may be registered in the management apparatus 20 in association with the vehicle 100 or a user. The management apparatus 20 may identify each of the on-vehicle apparatuses 10 on the basis of the identification data.

The communication unit 11 is configured to be coupled to the communication network N1 through a wireless communication system and communicate with the management apparatus 20 through the communication network N1. The wireless communication system may include, for example, a telematics mobile communication system or a wireless communication system of a mobile communication network.

The operation unit 13 may include, without limitation, a request operation unit 13*a* and an acceptance operation unit 13*b*. The request operation unit 13*a* may include, for example, an operation button, and is configured to make the power feeding request. The acceptance operation unit 13*b* may include, for example, an operation button, and is configured to express acceptance of the power feeding request.

The display processor 12 is configured to output an image or character display to the display panel 104. For example, the display processor 12 may provide, on the basis of an instruction from the processor 15, display regarding a common power price for the inter-vehicle power feeding, and display regarding the power feeding request for the inter-vehicle power feeding. The display regarding the power feeding request may include display such as "power feeding request is pending", "power feeding request is practicable", and "available for acceptance of power feeding request".

The storage 16 may include, without limitation, a storage unit 16*a* and a storage unit 16*b*. The storage unit 16*a* may hold the unique identification data. The storage unit 16*b* may hold the power price data, or the power unit price data, for the external charging on the occasion that the vehicle performs the external charging.

The management apparatus 20 may include, without limitation, a server computer installed in, for example, a data center. The management apparatus 20 may include, without limitation, a CPU 21, a RAM 22, a storage device 23, and a communication module 24. The CPU 21 may expand data in the RAM 22. The storage device 23 may hold a control program to be executed by the CPU 21, and control data. The communication module 24 may communicate with the plurality of the on-vehicle apparatuses 10. The management apparatus 20 may further include, without limitation, an input device 25. The input device 25 may allow an operator to input data and instructions.

The storage device 23 of the management apparatus 20 may include, without limitation, a history database 23*a*. The history database 23*a* may hold history data regarding the inter-vehicle power feeding performed under the management of the management apparatus 20. The history data regarding the inter-vehicle power feeding may include, without limitation, the ID of the on-vehicle apparatus 10 on the power-sender side, the ID of the on-vehicle apparatus 10 on the power-receiver side, the power price data for the external charging sent from the on-vehicle apparatus 10 on the power-sender side, and the data regarding the amount of fed power. The history data regarding the inter-vehicle power feeding may further include, without limitation, return data and price data. The return data means data regarding a return on the power-sender side of the inter-vehicle power feeding. The price data means data regarding a price on the power-receiver side of the inter-vehicle power feeding.

The storage device 23 of the management apparatus 20 may further include, without limitation, a storage unit 23*b*. The storage unit 23*b* may hold current common power price data for the inter-vehicle power feeding. The common power price data means data regarding the common power price. The common power price may be calculated in the management apparatus 20 and stored in the storage unit 23*b*, or alternatively, the common power price may be calculated outside the management apparatus 20 and set in the management apparatus 20.

<Power Feeding Management Operation>

Figure 2:
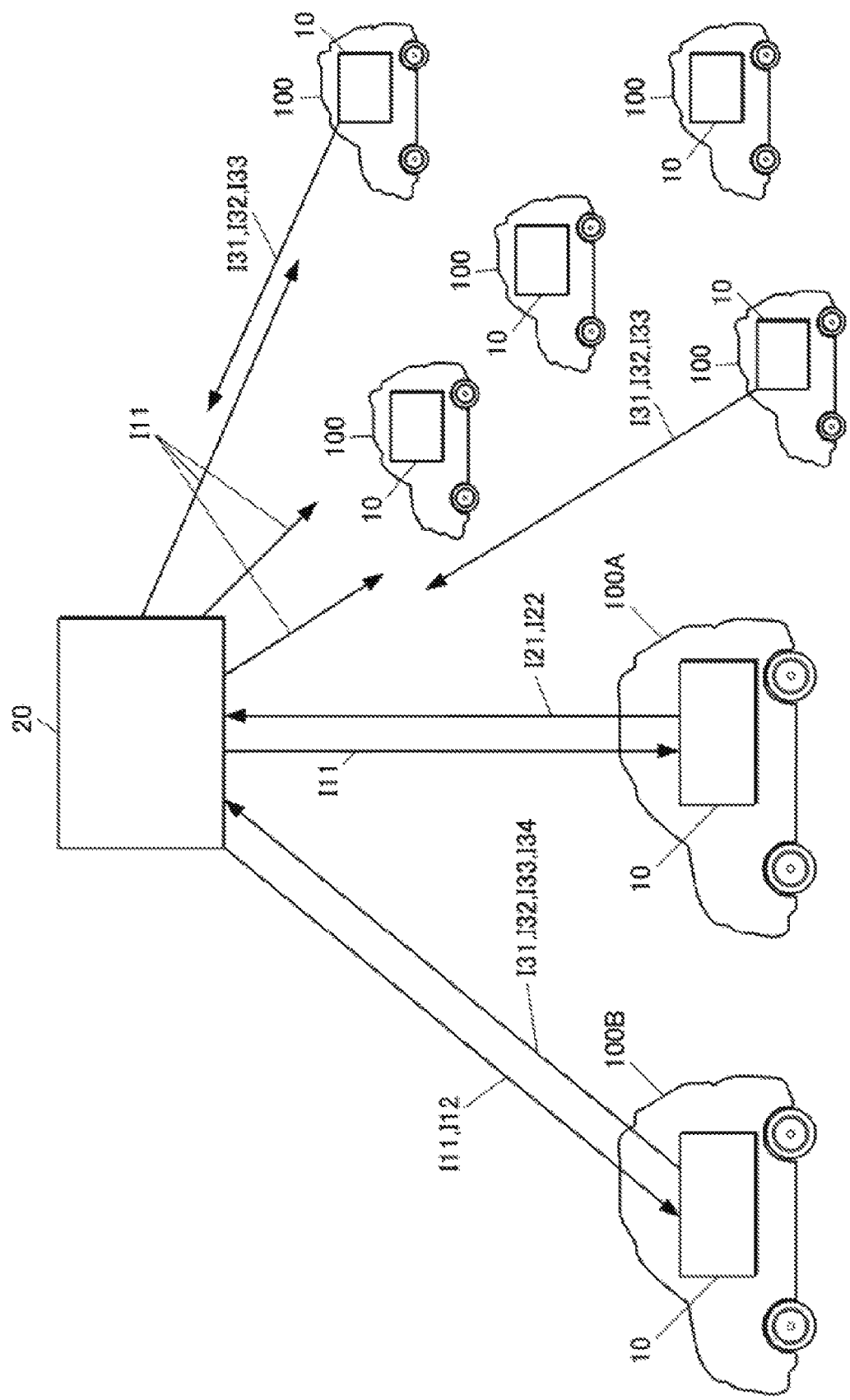
FIG. 2 illustrates operation of the power feeding management system before inter-vehicle power feeding.

FIG. 2 illustrates operation of the power feeding management system before the inter-vehicle power feeding.

The management apparatus 20 may send, in advance, common power price (power unit price) data I11 for the inter-vehicle power feeding toward the plurality of the on-vehicle apparatuses 10. The power price for the inter-vehicle power feeding may be set, for example, at a constant price over a predetermined period of time, e.g., several days to several months. The power price for the inter-vehicle power feeding may be registered in the storage unit 23b of the management apparatus 20. Upon receiving the power price data, the on-vehicle apparatus 10 may output the power price to the display panel 104 to provide an occupant of the vehicle 100 with the power price data for the inter-vehicle power feeding.

In the on-vehicle apparatus 10, while the vehicle 100 is in operation, the processor 15 may monitor the SOC of the battery 102, and switch a control state in accordance with the SOC. That is, in a case where the SOC is equal to or greater than a first threshold, the on-vehicle apparatus 10 may switch the control state to a state in which the vehicle 100 is available for acceptance of the power feeding request (referred to as "available state"). In a case where the SOC is smaller than a second threshold, the on-vehicle apparatus 10 may switch the control state to a state in which the power feeding request is practicable (referred to as "practicable state"). The first threshold may be set to a value where the SOC is sufficient. The second threshold may be set to a value where the SOC is small, or a smaller value than the first threshold.

In the available state, the on-vehicle apparatus 10 may periodically send a notification I31 of the available state, power price data I32 for the external charging held in the storage unit 16b, and positional data I33 regarding a location of the vehicle 100 to the management apparatus 20. The power price data I32 may be sent at separate timing. The positional data may include detailed point data or rough area data.

In the practicable state, the on-vehicle apparatus 10 may provide, on the display panel 104, display of notification that the power feeding request is practicable. Upon receiving an operation by the occupant of the vehicle 100 on the request operation unit 13a, the on-vehicle apparatus 10 may make the power feeding request.

In making the power feeding request, the on-vehicle apparatus 10 may send a power feeding request I21 and positional data I22 regarding a location of the vehicle 100 to the management apparatus 20. The positional data may include detailed point data or rough area data. In FIG. 2, the vehicle that has sent the power feeding request I21 is referred to as a first vehicle 100A.

Upon receiving the power feeding request I21, the management apparatus 20 may search for the on-vehicle apparatus 10 of the vehicle 100 that is in the available state and located in a region where the vehicle 100 is available for the power feeding to the first vehicle 100A. The management apparatus 20 may send a power feeding inquiry I12 to the relevant vehicle 100. In a case where an occupant of the vehicle 100 that has received the power feeding inquiry I12 makes an operation on the acceptance operation unit 13b, the on-vehicle apparatus 10 of the relevant vehicle 100 may send a response of acceptance I34 to the management apparatus 20. In FIG. 2, the vehicle that has sent the response of acceptance I34 is referred to as a second vehicle 100B.

Figure 3:
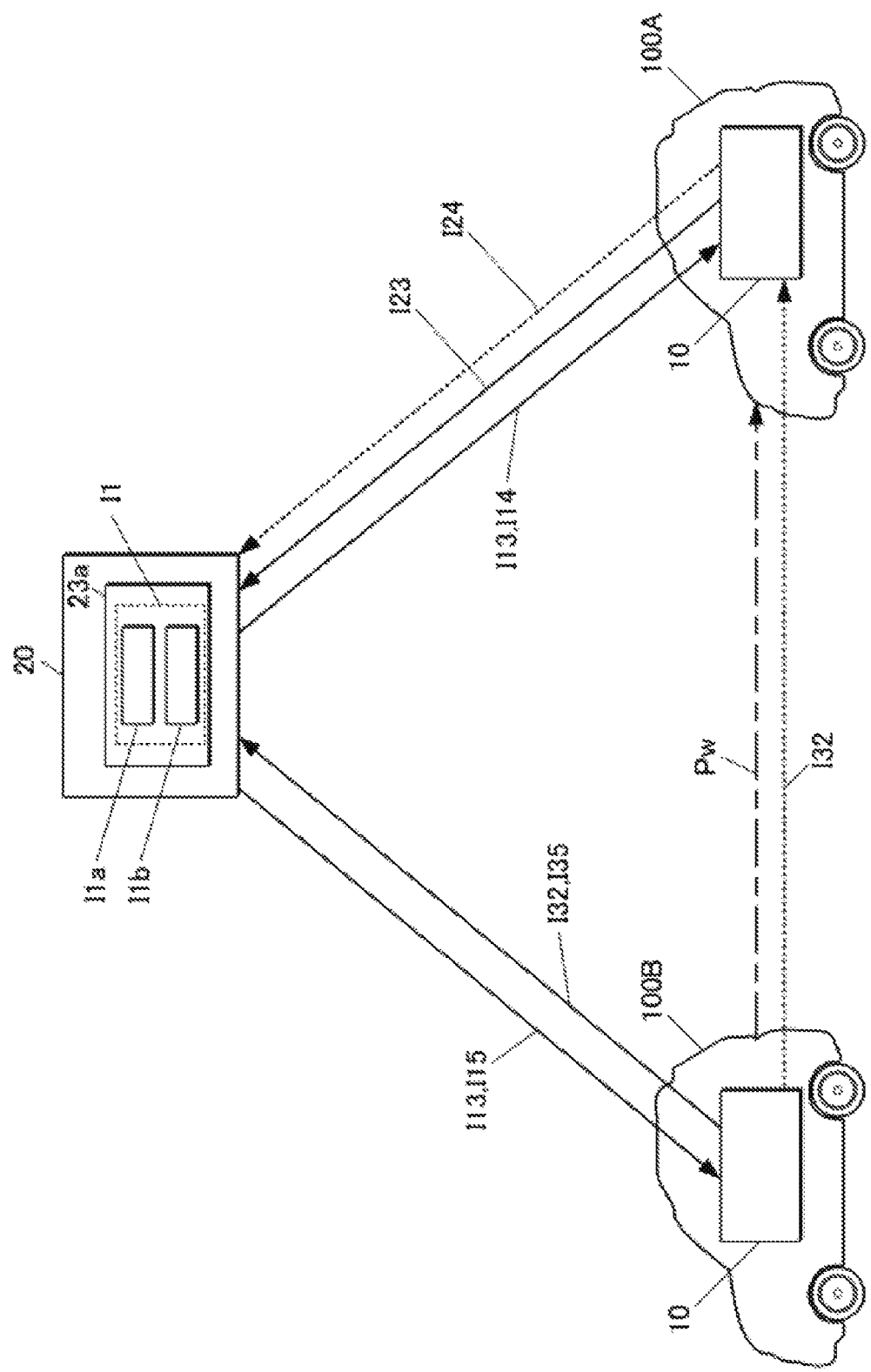
FIG. 3 illustrates the operation of the power feeding management system after the inter-vehicle power feeding.

FIG. 3 illustrates the operation of the power feeding management system at the time of the inter-vehicle power feeding. In the following, description is given of an example of the inter-vehicle power feeding to the first vehicle 100A from the second vehicle 100B. The inter-vehicle power feeding in this example is referred to as first inter-vehicle power feeding.

First, the management apparatus 20 may send assistance data I13 with the first inter-vehicle power feeding to the on-vehicle apparatus 10 of the first vehicle 100A and the on-vehicle apparatus 10 of the second vehicle 100B. The assistance data I13 may include data indicating a designated place of the first inter-vehicle power feeding and a procedure of a power feeding method. The designated place may be, for example, a parking space or a section of an expressway. The occupant of the first vehicle 100A and the occupant of the second vehicle 100B may perform the first inter-vehicle power feeding with the help of the assistance data I13. For example, they may couple cables in a parking space to carry out the power feeding. Alternatively, they travel in line on an expressway to carry out non-contact power feeding. By the first inter-vehicle power feeding, electric power Pw is transmitted from the second vehicle 100B to the first vehicle 100A.

On the occasion of the first inter-vehicle power feeding, the power price data I32 for the external charging may be sent from the on-vehicle apparatus 10 of the second vehicle 100B to the management apparatus 20 or the on-vehicle apparatus 10 of the first vehicle 100A. The power price data I32 may include the power price for the external charging the second vehicle 100B on the power-sender side carried out the previous time. The power price data I32 may be sent to the on-vehicle apparatus 10 of the first vehicle 100A through the management apparatus 20.

Furthermore, on the occasion of the first inter-vehicle power feeding, data I24 regarding a unit price difference may be sent to the management apparatus 20 from the on-vehicle apparatus 10 of the first vehicle 100A. The data I24 regarding the unit price difference may include a difference between the common power price (unit price) and the power price (unit price) for the external charging. Here, a case is assumed in which the power price data I32 for the external charging is sent to the on-vehicle apparatus 10 of the first vehicle 100A. The data I24 regarding the unit price difference may be calculated by the management apparatus 20.

At the end of the first inter-vehicle power feeding, data I23 and I35 regarding the amount of fed power in the first inter-vehicle power feeding may be sent to the management apparatus 20. The data I23 and I35 regarding the amount of fed power may be sent from the on-vehicle apparatus 10 of the first vehicle 100A, the on-vehicle apparatus 10 of the second vehicle 100B, or both.

In the history database 23a of the management apparatus 20, the data I23 and I35 regarding the amount of fed power as mentioned above may be accumulated as data I1a regarding the amount of fed power in one or more instances of the inter-vehicle power feeding with which the management apparatus 20 has assisted. Moreover, in the history database 23a of the management apparatus 20, the data I24 regarding the unit price difference as mentioned above may be accumulated as data I1b regarding the unit price difference in the one or more instances of the inter-vehicle power feeding with which the management apparatus 20 has assisted.

<Price for First Inter-Vehicle Power Feeding>

At the end of the first inter-vehicle power feeding, a price for the first inter-vehicle power feeding may be decided. Price data I14 may be sent from the management apparatus 20 to the on-vehicle apparatus 10 of the first vehicle 100A, and the on-vehicle apparatus 10 may notify the occupant of the price data I14. Alternatively, the user may access the management apparatus 20 with the use of, for example, a mobile phone, and check the price data I14.

The management apparatus 20 may decide the price on the basis of the data I1a regarding the amount of fed power in the first inter-vehicle power feeding and the prescribed common power price data I11 for the inter-vehicle power feeding. The price may be decided as, for example, multiplication of the common power unit price by the amount of fed power ((common power unit price)×(amount of fed power)), or addition of the multiplication of the common power unit price by the amount of fed power to a commission ((common power unit price)×(amount of fed power)+commission). Such calculation of the price may be carried out by the on-vehicle apparatus 10 of the first vehicle 100A.

Payment of the price may be asked of the user associated with the on-vehicle apparatus 10 of the first vehicle 100A at the time of the decision of the price. Alternatively, the payment of the price over a certain period of time may be collectively asked afterwards. Furthermore, electronic payment of the price may be made at the time of the decision of the price, or alternatively, the electronic payment of the price may be made afterwards.

<Return for First Inter-Vehicle Power Feeding>

Furthermore, at the end of the first inter-vehicle power feeding, a return for the first inter-vehicle power feeding may be decided. Return data I15 may be sent from the management apparatus 20 to the on-vehicle apparatus 10 of the second vehicle 100B, and the on-vehicle apparatus 10 may notify the occupant of the return data I15. Alternatively, the user may access the management apparatus 20 with the use of, for example, a mobile phone and check the return data I15.

The management apparatus 20 may decide the return on the basis of the power price data I32 for the external charging sent from the second vehicle 100B previously, and the data I23 of the amount of fed power in the first inter-vehicle power feeding. The return may be decided as, for example, multiplication of the power unit price for the external charging by the amount of fed power ((power unit price for external charging)×(amount of fed power)), addition of the multiplication of the power unit price for the external charging by the amount of fed power to a commission ((power unit price for external charging)×(amount of fed power)+(commission)), or multiplication of addition of the power unit price for the external charging to premium charge by the amount of fed power (((power unit price for external charging)+(premium charge))×(amount of fed power)). Such calculation of the return may be carried out by the on-vehicle apparatus 10 of the first vehicle 100A or the on-vehicle apparatus 10 of the second vehicle 100B.

The return may be paid to the user associated with the on-vehicle apparatus 10 of the second vehicle 100B by electronic payment at the time of the decision of the return, or alternatively, the return over a certain period of time may be collectively paid afterwards.

The management apparatus 20 may accumulate trade data I1 regarding the inter-vehicle power feeding in the history database 23a, each time the management apparatus 20 provides assistance with the inter-vehicle power feeding. The trade data I1 may include the data I1a regarding the amount of fed power in each instance of the inter-vehicle power feeding, and data regarding the return and the price for each instance of the inter-vehicle power feeding. However, the trade data I1 may include any data that allows for calculation of these pieces of data. For example, the return data may be changed to the data I32 in FIGS. 2 and 3, i.e., the power price data for the external charging held in the vehicle 100 on the power-sender side of the inter-vehicle power feeding. The price data may be changed to the common power price data at the time when the inter-vehicle power feeding is carried out.

Alternatively, the trade data I1 as mentioned above may include the data I1a regarding the amount of fed power in each instance of the inter-vehicle power feeding, and data regarding a difference between the return and the price. The trade data I1 may include any data that allows for calculation of these pieces of data. For example, the data regarding the difference between the return and the price may be changed to the power price data I32 in FIGS. 2 and 3, i.e., the power price data for the external charging held by the vehicle 100 on the power-sender side of the inter-vehicle power feeding, and the common power price data at the time when the inter-vehicle power feeding is carried out. Alternatively, the data regarding the difference between the return and the price may include the data I1b regarding the unit price difference as mentioned above. The unit price difference is the difference between the power unit price for the external charging and the common power unit price.

<Revision of Common Power Price for Inter-Vehicle Power Feeding>

In the power feeding management system 1, the common power price for the inter-vehicle power feeding may be revised every predetermined period of time, e.g., several days to several months. The common power price in a period of time after the revision may be decided on the basis of the trade data I1 regarding a plurality of instances of the inter-vehicle power feeding in a previous period of time accumulated in the history database 23a. In one embodiment of the technology, the period of time after the revision may serve as a "second period of time". In one embodiment of the technology, the previous period of time may serve as a "first period of time".

The plurality of the instances of the inter-vehicle power feeding in the previous period of time may include all the instances of the inter-vehicle power feeding carried out from the previous revision to the current revision. Alternatively, some of the plurality of the instances of the inter-vehicle power feeding may be excluded. In another alternative, some of instances of the inter-vehicle power feeding carried out before the previous revision may be included. Moreover, the plurality of the instances of the inter-vehicle power feeding in the previous period of time as mentioned above may be limited to the inter-vehicle power feeding performed in a certain area. That is, in the power feeding management system 1, the common power price for the inter-vehicle power feeding may be decided separately for an area A and an area B.

Though not particularly limited, the revision of the common power price may be calculated as follows. Here, the power price is expressed as a unit price. The common power unit price before the revision is denoted as A0. The common power unit price after the revision is denoted by A1. The power unit price in calculating the return, i.e., the power unit price for the external charging performed before the inter-vehicle power feeding, is denoted by Bi. Furthermore, the amount of fed power in each instance of the inter-vehicle power feeding is denoted by Hi. An average value of the difference between the return and the price in the period of time before the revision is denoted by D. The subscript i indicates an index identifying each instance of the inter-vehicle power feeding.

$$D = \frac{\sum_i \{(A0 - B_i) \times H_i\}}{\sum_i H_i} \quad (1)$$

$$A1 = A0 - D \quad (2)$$

Such revision of the common power price makes it possible to avoid accumulation of a sum of the return and the price on the negative side over a long period of time, or on the positive side more than necessary. Here, description is given assuming that the price to be paid from the user to management side is a positive value, and the return to be paid from the management side to the user is a negative value.

After the revision of the common power price for the inter-vehicle power feeding, data regarding the revised common power price may be stored in the storage unit 23b of the management apparatus 20 and used on the occasion of subsequent instances of the inter-vehicle power feeding. The common power price as mentioned above may be calculated by the management apparatus 20. Alternatively, the common power price may be calculated by a person and data regarding a calculation result of the common power price may be registered in the management apparatus 20.

<Control Example of On-Vehicle Apparatus>

Figure 4:
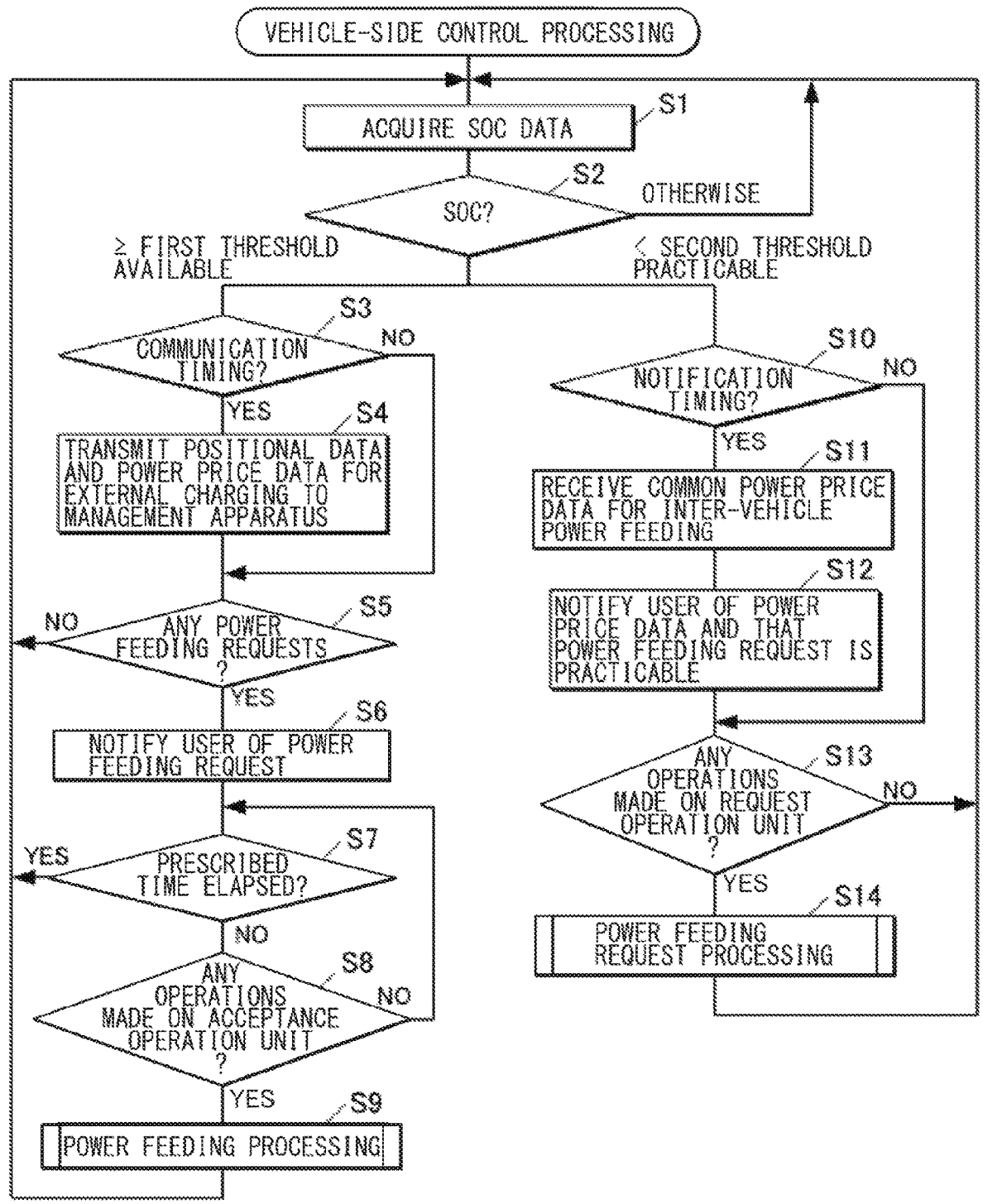
FIG. 4 is a flowchart of vehicle-side control processing to be carried out by a processor of an on-vehicle apparatus.
Figure 5:
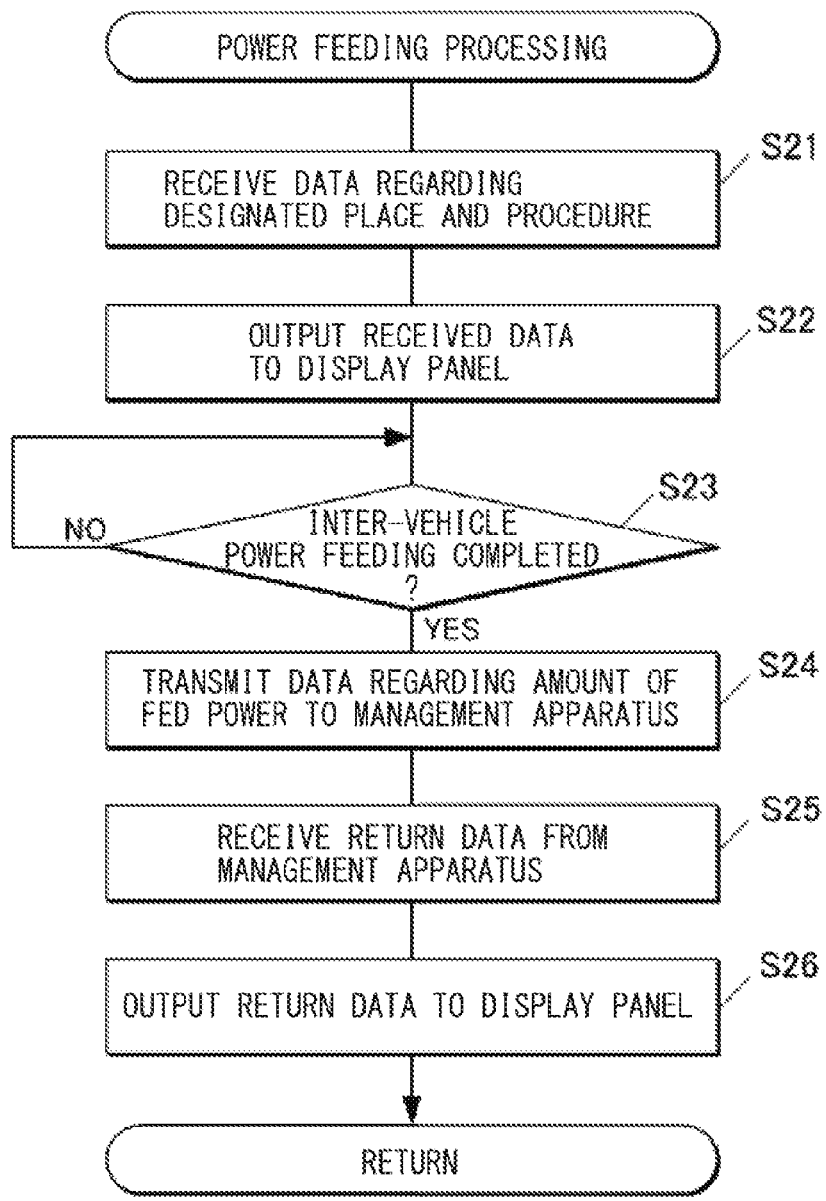
FIG. 5 is a flowchart of power feeding processing in step S9 in FIG. 4.
Figure 6:
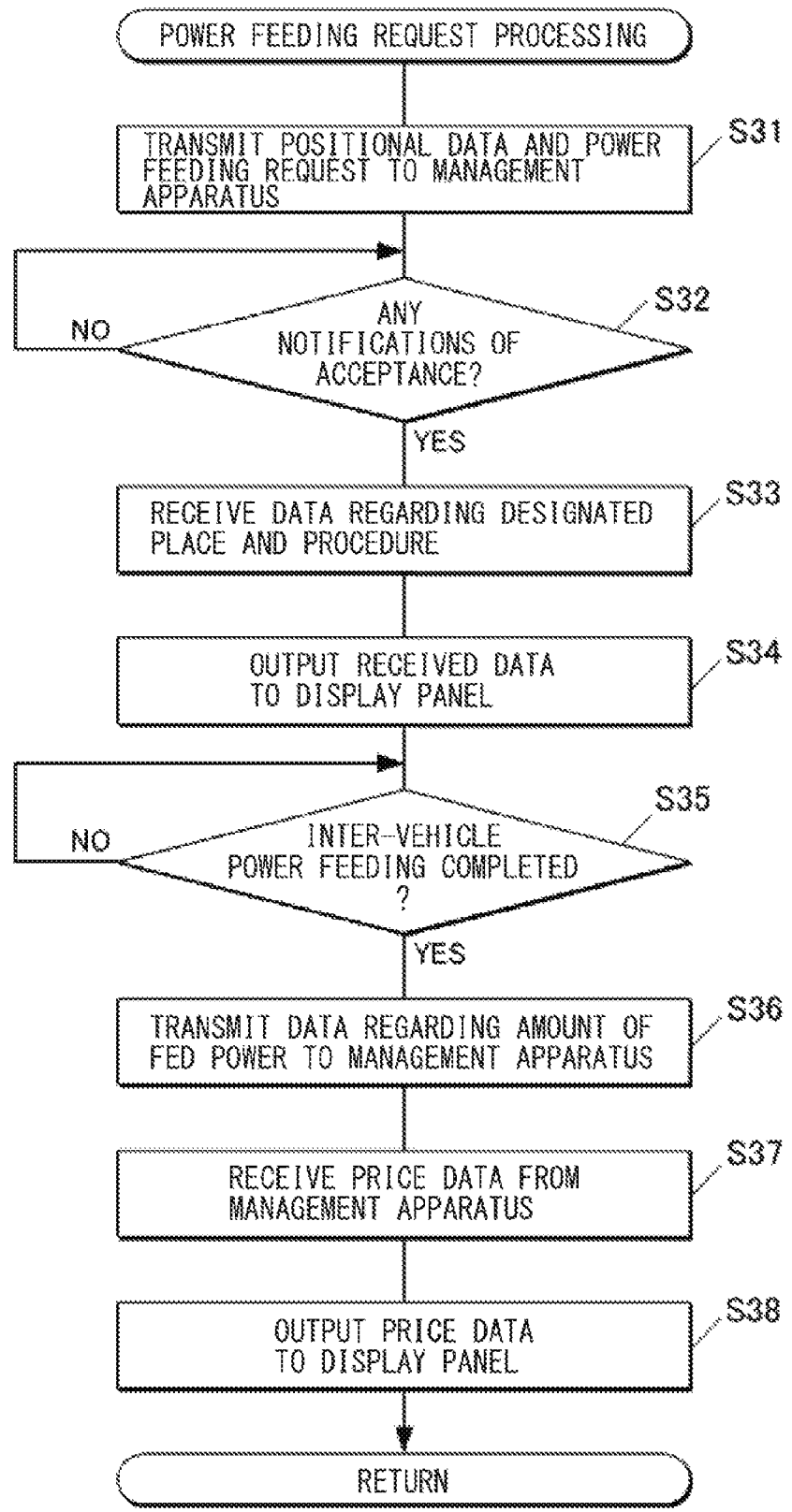
FIG. 6 is a flowchart of power feeding request processing in step S14 in FIG. 4.

Description now moves on to a control example of the on-vehicle apparatus 10 to realize the operation of the inter-vehicle power feeding described above. FIG. 4 is a flowchart of vehicle-side control processing to be carried out by the processor 15 of the on-vehicle apparatus 10. FIG. 5 is a flowchart of power feeding processing in step S9 in FIG. 4. FIG. 6 is a flowchart of power feeding request processing in step S14 in FIG. 4. The vehicle-side control processing may be started at a system start-up of the vehicle 100.

At the start of the vehicle-side control processing, the processor 15 may acquire the data regarding the SOC from the management unit of the battery 102 (step S1), and perform a branching process that includes switching the control state in accordance with the SOC (step S2). In the branching process, in the case where the SOC is equal to or greater than the first threshold, the processor 15 may cause the flow to branch to step S3, assuming the available state in which the vehicle 100 is available for the acceptance of the power feeding request. In the case where the SOC is smaller than the second threshold, the processor 15 may cause the flow to branch to step S10, assuming the practicable state in which the power feeding request is practicable. In a case where the SOC is equal to or greater than the second threshold and smaller than the first threshold, the processor 15 may cause the flow to return to step S1, assuming a stand-by state in which the vehicle 100 is not going to carry out the inter-vehicle power feeding. The first threshold may be set to the value where the SOC is sufficient. The second threshold may be set to the value where the SOC is small, or the smaller value than the first threshold.

As a result of the branching process, in the case where the flow proceeds to step S3, the processor 15 may periodically communicate with the management apparatus 20 through the communication unit 11 (steps S3 and S4), and send the positional data regarding the vehicle 100 and the power price data for the external charging held in the storage unit 16b to the management apparatus 20.

The processor 15 may determine presence or absence of the power feeding request from the management apparatus 20 (step S5). In a case with the absence of the power feeding request, the processor 15 may cause the flow to return to step S1.

In step S5, in a case with the presence of the power feeding request, the processor 15 may output the notification of the power feeding request to the display panel 104 (step S6), and determine, for a specified period of time, presence or absence of an operation on the acceptance operation unit 13b by an occupant (steps S7 and S8). The acceptance operation unit 13b may allow the occupant to accept the power feeding request. In a case with the absence of the operation on the acceptance operation unit 13b within the specified period of time, the processor 15 may cause the flow to return to step S1. In a case with the presence of the operation, the processor 15 may carry out power feeding processing, i.e., processing of coping with the power feeding request (step S9). At the end of the power feeding processing, the processor 15 may cause the flow to return to step S1.

As a result of the branching process in step S2, in the case where the flow proceeds to step S10, the processor 15 may periodically receive the common power price data for the inter-vehicle power feeding from the management apparatus 20 (steps S10 and S11). Furthermore, the processor 15 may output the power price data and the notification that the power feeding request is practicable, to the display panel 104 (step S12).

Furthermore, the processor 15 may determine presence or absence of an operation on the request operation unit 13a by the occupant (step S13). In a case with the absence of the operation, the processor 15 may cause the flow to return to step S1. In a case with the presence of the operation, the processor 15 may carry out the power feeding request processing (step S14). Thereafter, at the end of the power feeding request processing, the processor 15 may cause the flow to return to step S1.

In a case where the flow proceeds to the power feeding processing in step S9 in FIG. 4, as illustrated in FIG. 5, the processor 15 may, first, receive the data to be involved in the inter-vehicle power feeding from the management apparatus 20 (step S21). Such data may include the data regarding the designated place and the procedure. The processor 15 may output the data to the display panel 104 (step S22). Thereafter, the processor 15 may be on stand-by for the end of the inter-vehicle power feeding (step S23). In the meantime, the occupant of the vehicle 100 may move to the designated place to carry out the inter-vehicle power feeding. At the end of the inter-vehicle power feeding, the processor 15 may send the data regarding the amount of fed power to the management apparatus 20 (step S24), and receive the return data from the management apparatus 20 (step S25). The return may be decided on the basis of the amount of fed power and the power price for the external charging held in the storage unit 16b. Thereafter, the processor 15 may output the return data to the display panel 104 (step S26), and end the inter-vehicle power feeding processing. Thereafter, in the vehicle-side control processing in FIG. 4, the processor 15 may cause the flow to return to step S1.

In a case where the flow proceeds to the power feeding request processing in step S14 in FIG. 4, as illustrated in FIG. 6, the processor 15 may, first, send the positional data and the power feeding request to the management apparatus 20 (step S31). Thereafter, the processor 15 may be on stand-by for the acceptance of the power feeding request (step S32). In a case where the power feeding request is accepted, the processor 15 may receive the data regarding the designated place and the procedure of the inter-vehicle power feeding from the management apparatus 20 (step S33). Thereafter, the processor 15 may output the received data to the display panel 104 (step S34), and be on stand-by for the end of the inter-vehicle power feeding (step S35). In the meantime, the occupant of the vehicle 100 may move to the designated place to carry out the inter-vehicle power feeding.

At the end of the inter-vehicle power feeding, the processor 15 may send the data regarding the amount of fed power to the management apparatus 20 (step S36), and receive the price data from the management apparatus 20 (step S37). The price may be decided on the basis of the amount of fed power and the common power price received in step S10 in FIG. 4. Thereafter, the processor 15 may output the price data to the display panel 104 (step S38), and end the power feeding request processing. Thereafter, in the vehicle-side control processing in FIG. 4, the processor 15 may cause the flow to return to step S1.

Figure 7:
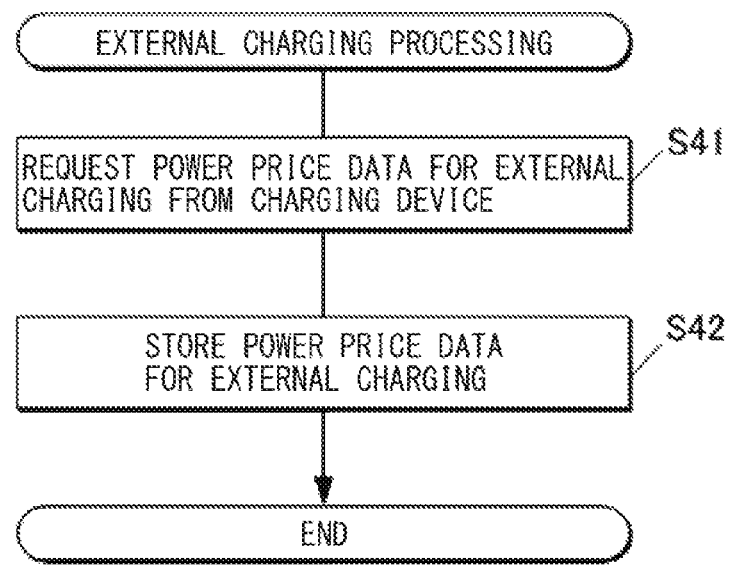
FIG. 7 is a flowchart of external charging processing to be carried out by the processor of the on-vehicle apparatus.

FIG. 7 is a flowchart of external charging processing to be carried out by the processor 15 of the on-vehicle apparatus 10. The external charging processing may be started in a case where the processor 15 receives the notification of the external charging from the charging device 110. At the start of the external charging processing upon the receipt of the notification, the processor 15 may request the power price data for the external charging from the charging device 110 (step S41). Upon receiving the relevant data, the processor 15 may store the power price data for the external charging in the storage unit 16b (step S42). Thus, the external charging processing may be ended.

Programs of the vehicle-side control processing and the external charging processing may be held in a non-transitory storage medium, or a non-transitory computer readable medium, such as the ROM of the processor 15. The processor 15 may be configured to read a program held in a portable non-transitory storage medium and execute the program. The portable non-transitory storage medium as mentioned above may hold a program of the vehicle-side control processing, the external charging processing, or both.

<Control Example of Management Apparatus>

Figure 8:
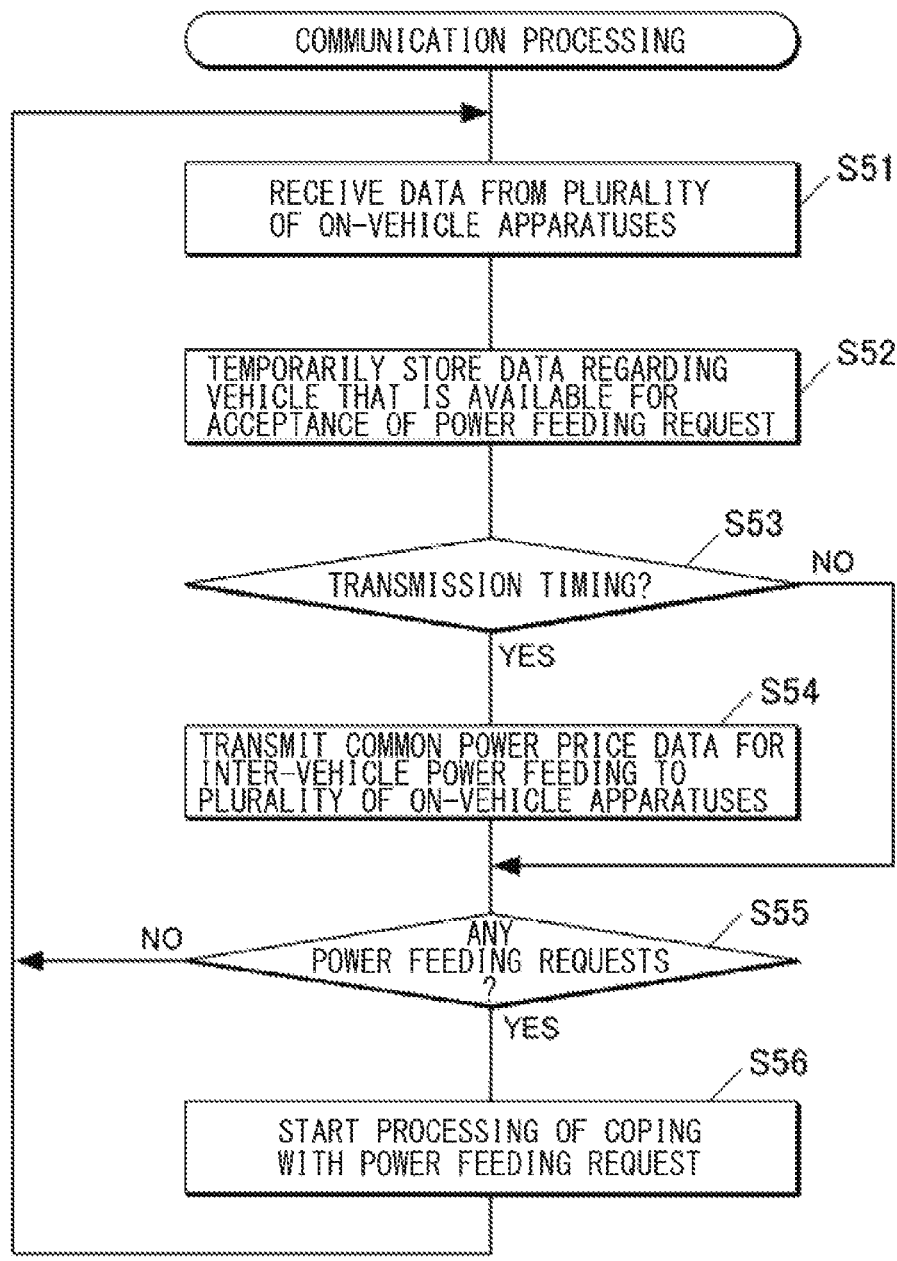
FIG. 8 is a flowchart of communication processing to be carried out by a processor of a management apparatus.

FIG. 8 is a flowchart of communication processing to be carried out by the CPU 21 of the management apparatus 20. The management apparatus 20 may constantly carry out the communication processing. In the communication processing, first, the CPU 21 may perform a process of receiving data sent from the plurality of the on-vehicle apparatuses 10 (step S51). Non-limiting examples of the data to be received may include the notification of the available state periodically sent from the on-vehicle apparatus 10 of the vehicle 100 in the available state, the positional data of the relevant vehicle 100, and the power price data for the external charging. Non-limiting examples of the data to be received in step S51 may also include the power feeding request and the positional data regarding the vehicle 100 that has made the power feeding request.

The CPU 21 may temporarily store the data regarding the vehicle 100 that is available for the acceptance of the power feeding request in step S51, e.g., the positional data regarding the relevant vehicle 100 and the power price data for the external charging (step S52).

The CPU 21 of the management apparatus 20 may carry out a process of periodically sending the common power price data for the inter-vehicle power feeding held in the storage unit 23b to the plurality of the on-vehicle apparatuses 10 (steps S53 and S54).

Furthermore, the CPU 21 of the management apparatus 20 may determine the presence or absence of the power feeding request on the basis of the data received in step S51 (step S55). In the case with the absence of the power feeding request received, the processor 15 may cause the flow to return to step S51. In the case with the presence of the power feeding request received, the processor 15 may start the processing of coping with the power feeding request, for each of the power feeding requests received (step S56). The processing of coping with a plurality of the power feeding requests may be parallely carried out, separately from the communication processing. Thereafter, the CPU 21 may cause the flow to return to step S1 and continue the communication processing.

Figure 9:
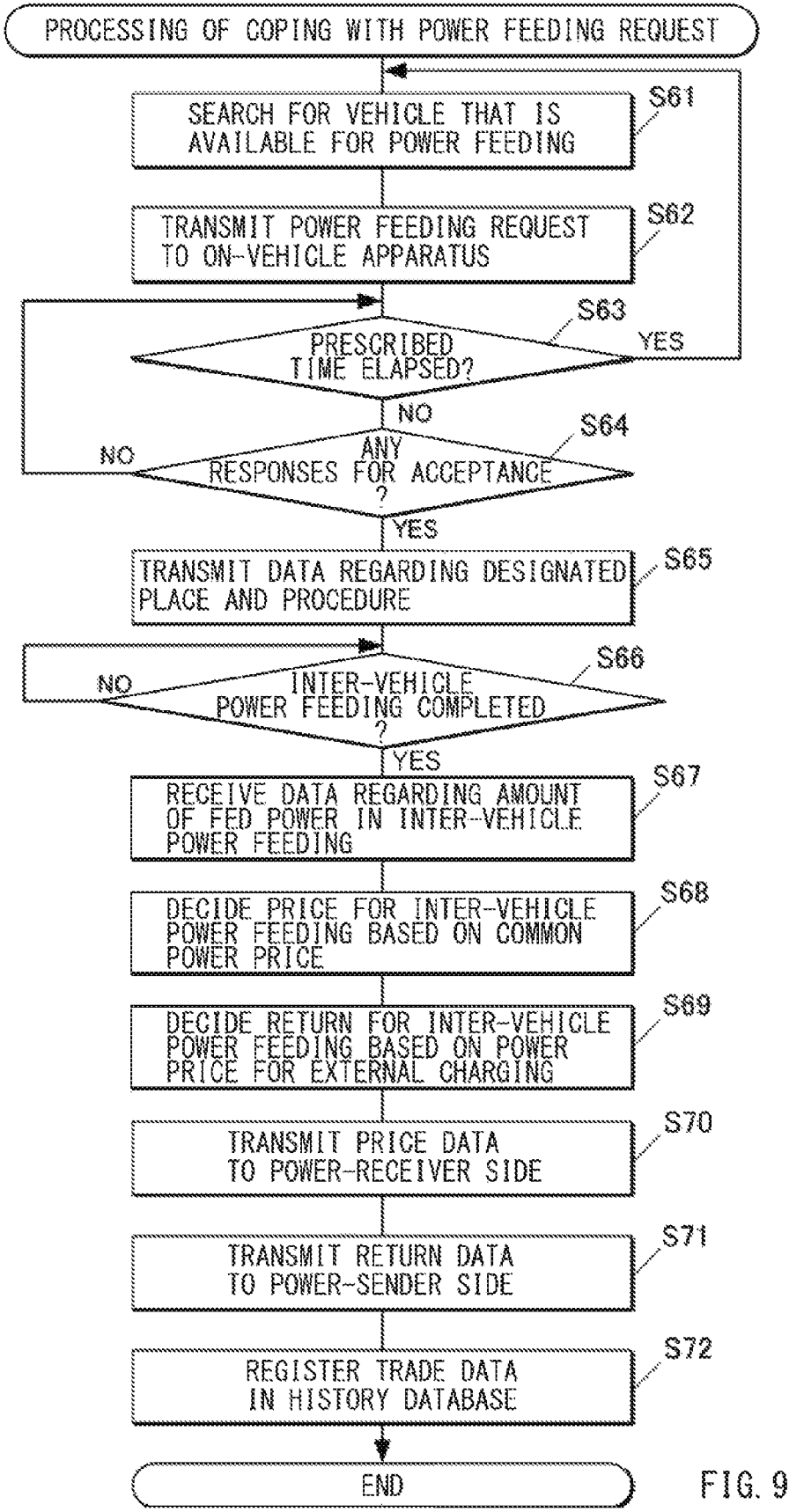
FIG. 9 is a flowchart of processing of coping with a power feeding request to be parallely started in step S56 in FIG. 8.

FIG. 9 is a flowchart of the processing of coping with the power feeding request to be carried out by the CPU 21 of the management apparatus 20. In a case where the power feeding request is made and the processing of coping with the power feeding request is started, the CPU 21 may, first, compare the positional data regarding the vehicle 100 that has made the power feeding request with the positional data regarding the vehicle 100 in the available state temporarily stored in step S52 in the communication processing in FIG. 8. Thus, the CPU 21 may search for the power-sender vehicle 100 that is available for the power feeding to the vehicle 100 that has made the power feeding request (step S61). As a result of the search, the CPU 21 may send the power feeding request to the on-vehicle device 10 of the vehicle 100 thus spotted (step S62), and determine, for the specified period of time, presence or absence of the response for acceptance from the relevant on-vehicle apparatus 10 (steps S63 and S64). In a case with the absence of the response, the CPU 21 may cause the flow to return to step S61, and repeat the processing from step S61. In a case with the presence of the response, the CPU 21 may send the data to be involved in the inter-vehicle power feeding, e.g., the data regarding the designated place and the procedure, to the on-vehicle apparatus 10 of the vehicle 100 that has made the power feeding request and the on-vehicle apparatus 10 of the vehicle 100 that has accepted the power feeding request (step S65). Thus, the CPU 21 may be on stand-by for the end of the inter-vehicle power feeding (step S66).

At the end of the inter-vehicle power feeding, the CPU 21 may receive the data regarding the amount of fed power in the inter-vehicle power feeding sent from the on-vehicle apparatus 10 on the power-sender side and the on-vehicle apparatus 10 on the power-receiver side (step S67). On the basis of the relevant data regarding the amount of fed power and the common power price data held in the storage unit 23b, the CPU 21 may decide the price on the power receiver side (step S68). Furthermore, the CPU 21 may decide the return on the power-sender side on the basis of the data regarding the amount of fed power received in step S67 and the power price data for the external charging sent from the on-vehicle apparatus 10 on the power-sender side (step S69). Thereafter, the CPU 21 may send the price data to the power-receiver side (step S70), and send the return data to the power-sender side (step S71). Thereafter, the CPU 21 may register the trade data regarding the inter-vehicle power feeding in the history database 23a (step S72). The trade data to be registered may include data such as the ID of the on-vehicle apparatus 10 on the power-sender side, the ID of the on-vehicle apparatus 10 on the power-receiver side, the amount of fed power in the inter-vehicle power feeding, the price, and the return. Thus, the processing of coping with the single power feeding request may be ended.

The processing of coping with the power feeding request as described above may be carried out for each of the power feeding requests. Thus, a plurality of instances of the inter-vehicle power feeding may be carried out corresponding to respective ones of the plurality of the power feeding requests. The trade data regarding the inter-vehicle power feeding thus carried out may be registered in the history database 23a.

Figure 10:
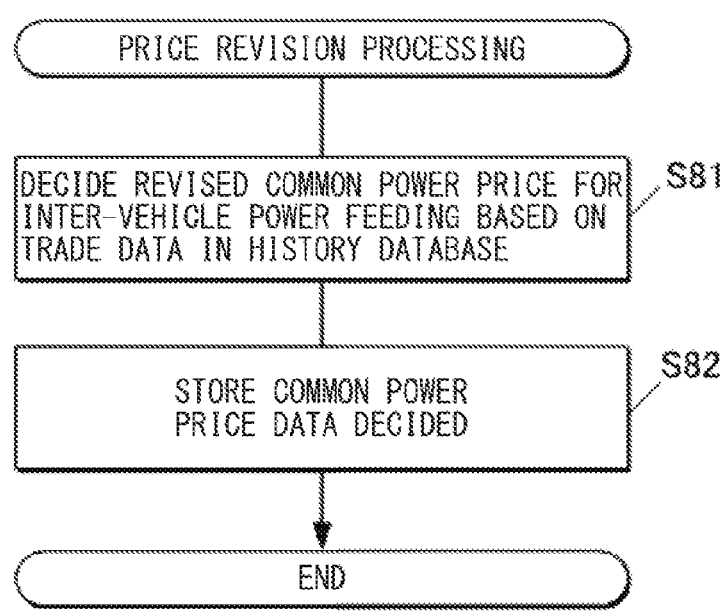
FIG. 10 is a flowchart of price revision processing to be carried out by the processor of the management apparatus.

FIG. 10 is a flowchart of price revision processing to be carried out by the CPU 21 of the management apparatus 20. The price revision processing may be performed every predetermined period of time, e.g., several days to several months. At the start of the price revision processing, the CPU 21 may read the trade data included in the respective entries from the history database 23a retroactively for a preset period. With the use of the trade data, the CPU 21 may decide the revised common power price for the inter-vehicle power feeding (step S81). The common power price may be decided as described above. The CPU 21 may store the power price data thus decided in the storage unit 23b, and end the price revision processing.

It is to be noted that the calculation of the common power price in step S81 may be made by another system with the use of the data in the history database 23a, or may be made by a person.

With the control operation of the on-vehicle apparatus 10 as described above, and the control operation of the management apparatus 20, the operation of the inter-vehicle power feeding described in FIGS. 2 and 3 is realized.

Programs of the communication processing, the processing of coping with the power feeding request, and the price revision processing may be held in a non-transitory storage medium, or a non-transitory computer readable medium such as the storage device 23. The CPU 21 may be configured to read a program held in a portable non-transitory storage medium and execute the program. The portable non-transitory storage medium as mentioned above may hold a program of the communication processing, the processing of coping with the power feeding request, the price revision processing, or any combination thereof.

As described above, according to the power feeding management system 1 of this embodiment, the management apparatus 20 communicates with the on-vehicle apparatus 10 of the first vehicle 100A that has made the power feeding request, and the on-vehicle apparatus 10 of the second vehicle 100B that is available for the power feeding, to provide assistance with the inter-vehicle power feeding. Furthermore, the management apparatus 20 decides the price on the power-receiver side on the basis of the common power price and the amount of fed power. The management apparatus 20 also decides the return on the power-sender side on the basis of the power price for the external charging and the amount of fed power. Hence, it is possible to reduce a situation in which the occupant of the first vehicle 100A who wants the inter-vehicle power feeding gets confused about which vehicle they should be fed with electric power from. Furthermore, deciding the return on the power-sender side on the basis of the power price for the external charging makes it possible to motivate the power-sender side to respond to the power feeding request. Hence, it is possible to carry out smooth inter-vehicle power feeding.

In need of power feeding, the occupant of the vehicle 100 may get confused about which vehicle they should be fed with electric power from, and delay the power feeding. This may result in electric power shortage of the battery 102, and possibility may be that the vehicle 100 becomes unable to travel. However, according to the power feeding management system 1, it is possible to attain smooth inter-vehicle power feeding. Hence, it is possible to reduce the situation in which the delay in the power feeding makes the vehicle 100 unable to travel.

Furthermore, according to the power feeding management system 1 of this embodiment, at the time of price revision, the common power price for the inter-vehicle power feeding in the next period of time may be decided on the basis of the trade data regarding the one or more instances of the inter-vehicle power feeding with which the management apparatus 20 has assisted. This makes it possible to avoid the accumulation of the sum of the return and the price on the negative side over a long period of time, or on the positive side more than necessary. Hence, it is possible to maintain the power feeding management system 1 for a long time.

In addition, according to the power feeding management system 1 of this embodiment, the on-vehicle apparatus 10 may include the storage 16. The storage 16 is configured to hold the power price data for the external charging at the occasion that the external charging is carried out by the charging device 110. The power price data for the external charging is used in the calculation by the management apparatus 20 of the return for the inter-vehicle power feeding. Providing the on-vehicle apparatus 10 with the storage 16 suppresses the power price data from being lost before the calculation of the return. Furthermore, according to the power feeding management system 1 of this embodiment, the on-vehicle apparatus 10 may be allowed to make the power feeding request in the case where the SOC of the battery 102 is smaller than the second threshold. This leads to suppression of needless issue of the power feeding request, as well as quick response to the power feeding request in case of need. Hence, it is possible to reduce a situation in which depletion of the SOC of the battery 102 makes the vehicle 100 unable to travel.

Moreover, according to the on-vehicle apparatus 10 of this embodiment, the on-vehicle apparatus 10 is configured to send, to the management apparatus 20, the power feeding request for the inter-vehicle power feeding the price for which is decided on the basis of the common power price. The on-vehicle apparatus 10 is configured to receive, from the management apparatus 20, the power feeding request for the inter-vehicle power feeding the return for which is decided on the basis of the power price for the external charging. Hence, in the case where the occupant of the vehicle 100 makes the power feeding request, it is possible to reduce the situation in which the occupant of the vehicle 100 gets confused about which vehicle they should be fed with electric power from. Furthermore, in the case where the occupant of the vehicle 100 accepts the power feeding request, the return is decided on the basis of the power price for the external charging. This motivates the occupant to accept the power feeding request. Hence, it is possible to attain the smooth inter-vehicle power feeding between the plurality of the vehicles 100 including the on-vehicle apparatuses 10, leading to the reduction in the situation in which the delay in the power feeding makes the vehicle 100 unable to travel.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing example embodiments, some examples are given of mathematical expressions for the calculation of the price, the calculation of the return, and the calculation of the common power price. However, various modifications may be applied to the mathematical expressions for the calculation within the scope of the technology. Moreover, in the forgoing example embodiments, the example is described in which sending and accepting the power feeding request involve the operation by the occupant of the vehicle 100. However, there are no particular limitation on conditions on which the power feeding request is sent and/or accepted, and methods of sending and accepting the power feeding request. For example, the power feeding request may be automatically made and/or accepted on a predetermined condition. Furthermore, in the forgoing example embodiments, one example is described of the data to be transmitted and timing of the transmission between the on-vehicle apparatus of the power-sender vehicle, the on-vehicle apparatus of the power-receiver vehicle, and the management apparatus. However, the transmission of some kinds of data may be omitted, and the timing of the transmission may be changed as appropriate. Other details described in the forgoing example embodiments may be changed as appropriate within the scope of the technology.

Each of the processor 15 and the CPU 21 illustrated in FIG. is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the processor 15 and the CPU 21 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the processor 15 and the CPU 21 illustrated in FIG. 1.

The invention claimed is:

1. A power feeding management system comprising:
    a management apparatus configured to perform management related to inter-vehicle power feeding; and
    a plurality of on-vehicle apparatuses mounted on respective ones of a plurality of vehicles and configured to communicate with the management apparatus, the plurality of the vehicles being configured to perform the inter-vehicle power feeding, wherein
    the management apparatus has setting of a common power price for the inter-vehicle power feeding,
    the management apparatus is configured to communicate with the on-vehicle apparatus of a first vehicle out of the plurality of the vehicles and the on-vehicle apparatus of a second vehicle out of the plurality of the vehicles, to assist the first vehicle and the second vehicle with first inter-vehicle power feeding to the first vehicle from the second vehicle, the first vehicle making a power feeding request, and the second vehicle being available for acceptance of the power feeding request, and
    the management apparatus is configured to:
        decide a price on power-receiver side of the first inter-vehicle power feeding on a basis of the common power price and an amount of fed power in the first inter-vehicle power feeding; and
        decide a return on power-sender side of the first inter-vehicle power feeding on a basis of the amount of fed power in the first inter-vehicle power feeding and a power price for external charging carried out by the second vehicle before the first inter-vehicle power feeding.

2. The power feeding management system according to claim 1, wherein
    the common power price in a second period of time after a first period of time is decided on a basis of trade data regarding one or more instances of the inter-vehicle power feeding with which the management apparatus has assisted during the first period of time.

3. The power feeding management system according to claim 1, wherein
    the plurality of the on-vehicle apparatuses each includes a storage, and
    on an occasion that the external charging is carried out, the storage is configured to hold data regarding the power price for the external charging.

4. The power feeding management system according to claim 2, wherein
    the plurality of the on-vehicle apparatuses each includes a storage, and
    on an occasion that the external charging is carried out, the storage is configured to hold data regarding the power price for the external charging.

5. An on-vehicle apparatus to be mounted on a vehicle configured to perform inter-vehicle power feeding and external charging, the on-vehicle apparatus comprising
    a communication unit configured to communicate with a management apparatus disposed outside the vehicle,
    the communication unit is configured to:
        receive, from the management apparatus, a power feeding request for the inter-vehicle power feeding a return for which is decided on a basis of a power price for the external charging; and
        send, to the management apparatus, a power feeding request for the inter-vehicle power feeding a price for which is decided on a basis of a common power price.

6. The on-vehicle apparatus according to claim 5, further comprising a storage, wherein
    on an occasion that the external charging is carried out, the storage is configured to hold data regarding the power price for the external charging, and
    the communication unit is configured to:
        receive, from the management apparatus, data regarding the common power price; and
        send, to the management apparatus, the data regarding the power price for the external charging.

7. A power feeding management system comprising:
    a management apparatus configured to perform management related to inter-vehicle power feeding; and
    a plurality of on-vehicle apparatuses mounted on respective ones of a plurality of vehicles and configured to communicate with the management apparatus, the plurality of the vehicles being configured to perform the inter-vehicle power feeding, wherein
    the management apparatus includes a storage device configured to hold setting of a common power price for the inter-vehicle power feeding,
    the management apparatus is configured to communicate with the on-vehicle apparatus of a first vehicle out of the plurality of the vehicles and the on-vehicle apparatus of a second vehicle out of the plurality of the vehicles, to assist the first vehicle and the second vehicle with first inter-vehicle power feeding to the first vehicle from the second vehicle, the first vehicle making a power feeding request, and the second vehicle being available for acceptance of the power feeding request, and the management apparatus includes circuitry configured to:

decide a price on power-receiver side of the first inter-vehicle power feeding on a basis of the common power price and an amount of fed power in the first inter-vehicle power feeding; and decide a return on power-sender side of the first inter-vehicle power feeding on a basis of the amount of fed power in the first inter-vehicle power feeding and a power price for external charging carried out by the second vehicle before the first inter-vehicle power feeding.

* * * * *